United States Patent [19]

Yoshida et al.

[11] Patent Number: 5,676,024
[45] Date of Patent: Oct. 14, 1997

[54] CAM DEVICE

[75] Inventors: Kiyomi Yoshida; Fumiyuki Iwano; Michio Ueda, all of Tokushima, Japan

[73] Assignee: Shikoku Kokai Co., Ltd., Tokushima, Japan

[21] Appl. No.: 564,592

[22] Filed: Nov. 29, 1995

[30] Foreign Application Priority Data

Dec. 1, 1994 [JP] Japan .................... 6-298134
Jun. 15, 1995 [JP] Japan .................... 7-148990

[51] Int. Cl.$^6$ ........................................ F16H 53/00
[52] U.S. Cl. .................... 74/569; 74/567; 74/821; 101/411
[58] Field of Search ............ 74/567, 569, 53, 74/821; 101/411

[56] References Cited

U.S. PATENT DOCUMENTS

| 2,543,649 | 2/1951 | Wales et al. ........................ 74/53 |
| 4,301,696 | 11/1981 | Anderson ........................ 74/569 X |
| 4,726,253 | 2/1988 | Russell ............................ 74/569 |
| 4,796,522 | 1/1989 | Lynch ............................ 74/569 X |
| 4,854,236 | 8/1989 | Thunker et al. .................. 74/569 X |
| 5,544,537 | 8/1996 | Konzal ............................ 74/53 |

FOREIGN PATENT DOCUMENTS

| A-0 254 897 | 2/1988 | European Pat. Off. . | |
| 1101917 | 10/1955 | France ................... | 74/569 |
| 1001607 | 1/1957 | Germany ................. | 74/569 |
| B-11 70 741 | 5/1964 | Germany . | |
| 5-196110 | 8/1993 | Japan ..................... | 74/569 |
| 91060 | 12/1957 | Norway .................. | 74/569 |
| 715867 | 2/1980 | U.S.S.R. ................. | 74/569 |
| 2233728 | 1/1991 | United Kingdom ....... | 74/569 |

OTHER PUBLICATIONS

Soviet Inventions Illustrated, Section PQ, Week 8317, Derwent Publications Ltd. London, GB; Jun. 23, 1982, Abstract of SU-A-937-847.

*Primary Examiner*—Vinh T. Luong
*Attorney, Agent, or Firm*—Armstrong, Westerman, Hattori, McLeland & Naughton

[57] ABSTRACT

A cam device includes an armlike cam follower for moving a lift unit upward and downward, and a plate cam having a cam contour face in contact with the cam follower. The cam is formed in a side surface thereof with a recessed portion having an inwardly facing periphery which provides a guide face extending along the cam contour face. A movable roller is in bearing contact with the guide face. The cam follower and the movable roller are biased toward each other by and elastic member.

5 Claims, 9 Drawing Sheets

CAM DEVICE

BACKGROUND OF THE INVENTION

The present invention relates to a cam device, for example, for driving a lift unit equipped with container forming jaws for making a content-filled vertical tube into baglike containers by sealing the tube at an interval corresponding to the length of one container and cutting the sealed portions.

This type of device already known comprises an armlike cam follower for moving the lift unit upward and downward, a plate cam having a cam contour face in contact with the cam follower and a hydraulic cylinder holding the cam follower in pressing contact with the cam.

Another device is also known which comprises an armlike cam follower pivoted to the lift unit, a roller attached to the cam follower and a groove cam formed in a side surface thereof with an annular groove having the roller fitted therein.

The former device requires an increased drive torque because the pressure of the cam follower given by the hydraulic cylinder acts as a load on the cam in rotation during the entire period of operating cycles.

With the latter device, the cam follower fails to follow the cam with high accuracy because it is impossible to eliminate a clearance between the roller and either side face of the grooved portion, permitting play of the roller.

SUMMARY OF THE INVENTION

An object of the present invention is to provide a cam device which is made free of the likelihood that the force for pressing a follower against a cam will act as a load to reduce the torque for driving the device and wherein the follower follows the cam with high accuracy.

The present invention provides a cam device comprising an armlike cam follower for moving a lift unit upward and downward, and a plate cam having a cam contour face in contact with the cam follower, the cam device being characterized in that the cam is formed in a side surface thereof with a recessed portion having an inwardly facing periphery, the inwardly facing periphery providing a guide face extending along the cam contour face, a movable roller being in bearing contact with the guide face, the cam follower and the movable roller being biased toward each other by elastic means. Because of the feature described above, the elastic force of the elastic means presses the follower against the cam contour face and the movable roller against the guide face, with the result that the pressure of the follower and the pressure of the movable roller applied by the elastic means offset each other. Further since the follower or the movable roller causes no displacement of a spring constituting the elastic means, the pressure of the follower does not act as a load on the cam when the cam is rotated. Consequently, the torque for driving the device can be diminished according to the invention.

Furthermore, the movable roller is pressed against the guide face by the elastic means at all times, so that the contact therebetween involves no play, permitting the follower to follow the cam with improved accuracy.

The elastic means may comprise a lever supported at one end thereof by the cam follower so as to be pivotally movable upward and downward and having the movable roller attached thereto between opposite ends thereof, and a spring biasing the lever so as to move the movable roller toward the cam follower, the point of support of the lever being at a greater distance from the position where the lever is biased by the spring than from the position where the movable roller is attached to the lever. The force of the spring is then delivered to the movable roller upon being increased by the lever, consequently pressing the movable roller against the guide face efficiently.

Preferably, the spring is a coiled compression spring and accommodated in a tubular housing closed with a wall at each of its opposite ends, the housing being pivoted at one end thereof to the cam follower, a rod extending through the wall of the other end of the housing, the rod being provided with a flange at one end thereof inside the housing, the spring being held in a compressed state between the flange and the other end wall of the housing, the other end of the rod being pivoted to the other end of the lever, a spring holding bolt being screwed into the wall of the above-mentioned one end of the housing so as to cause its screwed-in end to compress the spring through the flange. The spring holding bolt, when holding the spring in a compressed state, produces a clearance between the guide face and the movable roller to relieve the cam follower of the force of the spring. As a result, the cam and the cam follower can be easily disassembled and assembled, for example, for maintenance.

The elastic means described above may be replaced by another elastic means which comprises a lever supported at a point between opposite ends thereof by the cam follower so as to be pivotally movable upward and downward and having the movable roller attached thereto at one of the opposite ends, and a spring biasing the lever so as to move the movable roller toward the cam follower, the point of support of the lever being at a greater distance from the position where the lever is biased by the spring than from the position where the movable roller is attached to the lever.

The spring may be a coiled compression spring and accommodated in a tubular housing closed with a wall at each of its opposite ends, the housing being pivoted at one end thereof to the cam follower, a rod extending through the wall of the other end of the housing, the rod being provided with a flange at one end thereof inside the housing, the spring being held in a compressed state between the flange and the wall of the above-mentioned one end of the housing, the other end of the rod being pivoted to the other end of the lever, a spring holding bolt being screwed into the other end wall of the housing so as to cause its screwed-in end to compress the spring through the flange.

DESCRIPTION OF THE PREFERRED EMBODIMENTS

Embodiments of the invention will be described next with reference to the drawings.

In the following description, the term "front" refers to the side toward the direction of arrow A in FIG. 1, the term "rear" to the opposite side, and the terms "right" and "left" are used for the device as it is seen from behind.

Figure 1:
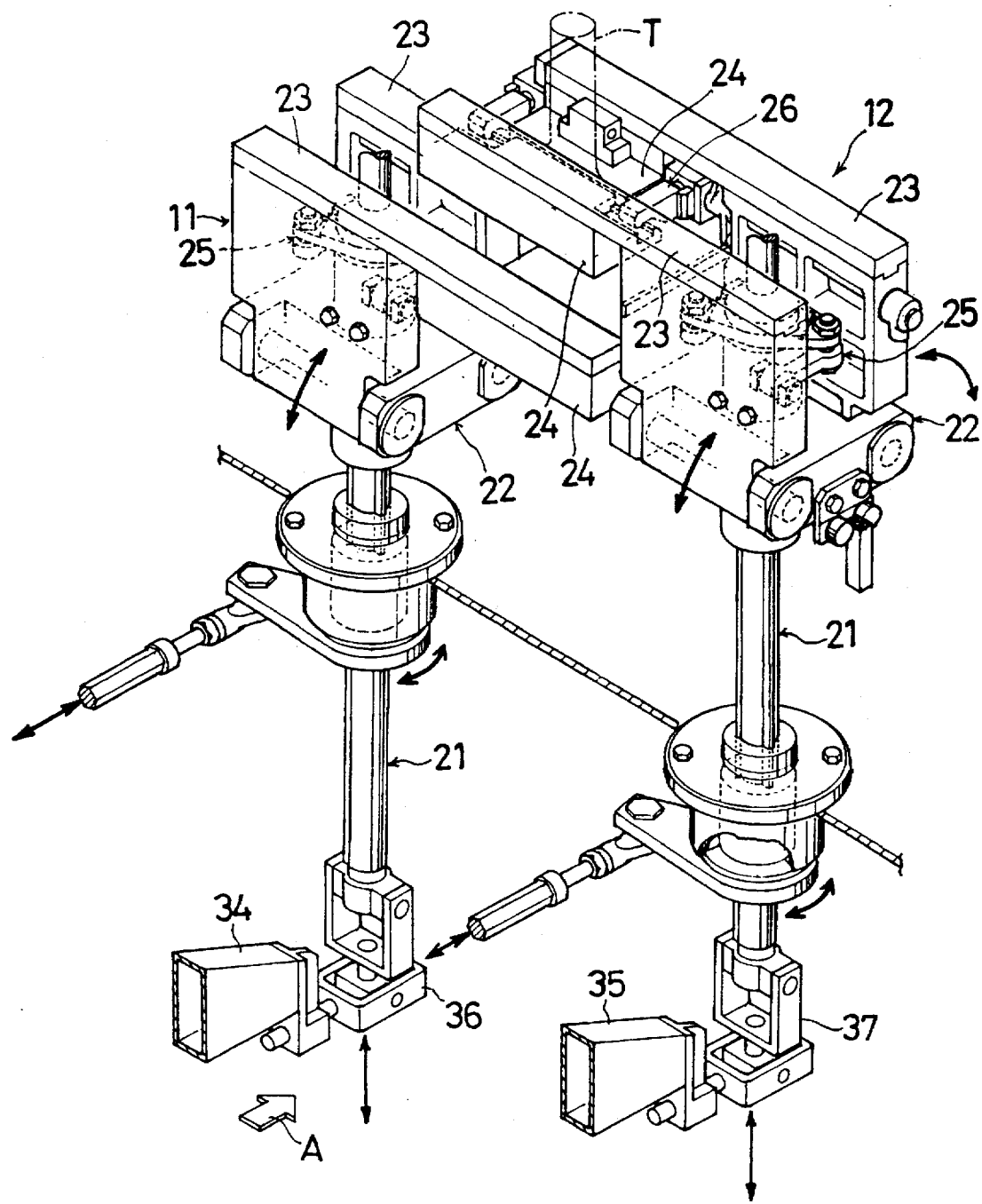
FIG. 1 is a perspective view showing jaw units of a container forming apparatus including a cam device of the invention.
Figure 2:
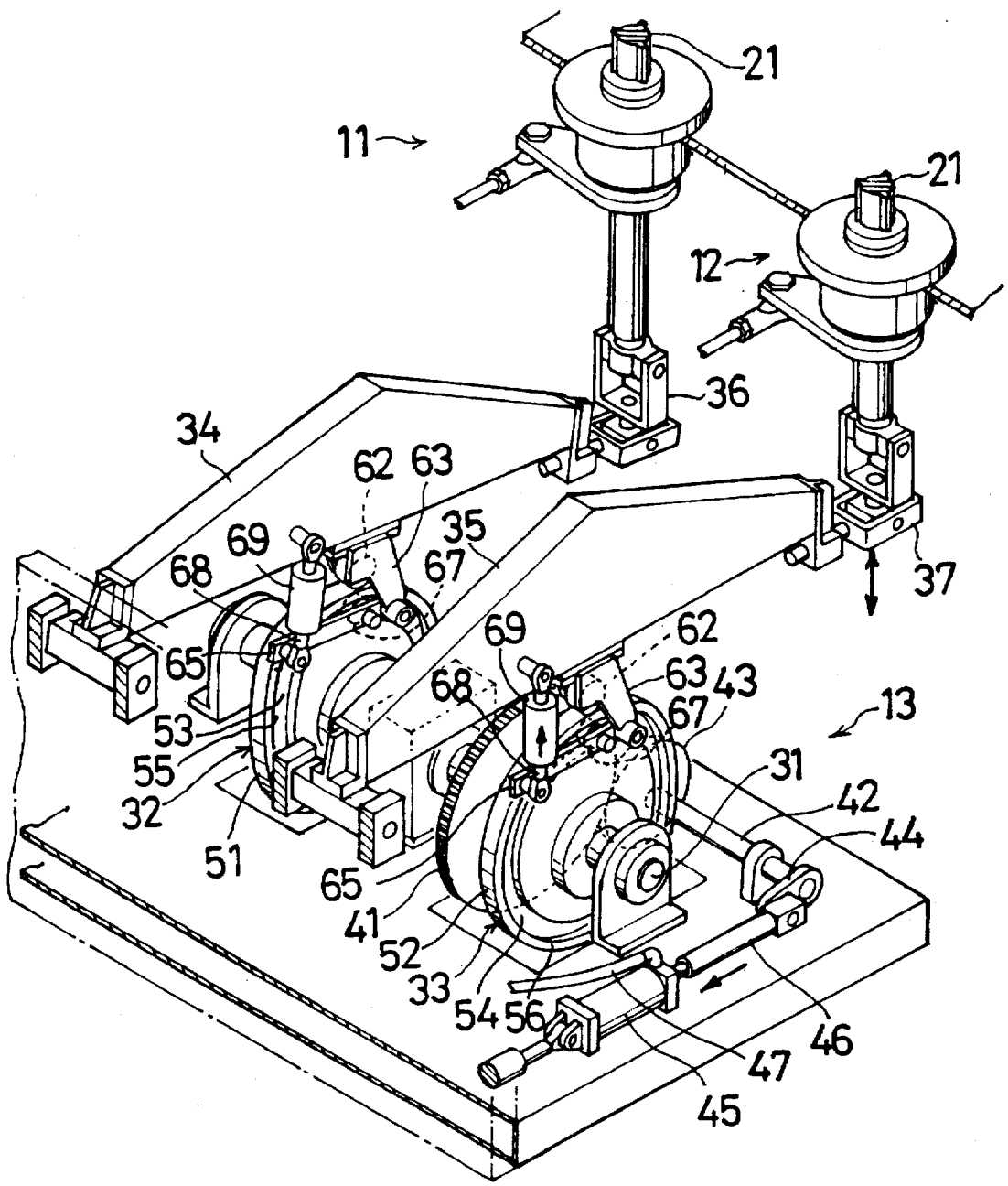
FIG. 2 is a perspective view showing the drive mechanism of the apparatus.

With reference to FIGS. 1 and 2, a container forming apparatus comprises left and right jaw units 11, 12 for holding a content-filled heat-sealable tube T thereacross to form sealed portions having a width and cutting the sealed portions each at the midportion of the width, and a drive mechanism 13 for moving these jaw units 11, 12 alternately up and down in different directions as timed with each other with a stroke length corresponding to the length of the container to be made.

The jaw units 11, 12 have the same construction although oriented in opposite directions transversely of the apparatus. The right jaw unit 12 only will be described below, and like parts of these units 11, 12 are designated by like reference numerals and will not be described repeatedly.

The jaw unit 12 comprises a vertical rod 21 which is movable up and down and reversibly rotatable, a lift frame 22 movable up and down with the vertical rod 21 and mounted on the rod 21 so as to permit the reversible rotation thereof, a pair of front and rear pivotal arms 23 supported at their lower portions by the lift frame 22 so as to be movable respectively about a pair of horizontal axes parallel to each other, a pair of front and rear jaws 24 fixed to the upper portions of the respective pivotal arms 23 and opposed to each other, an arm opener 25 for pivotally moving the arms 23 between a closed position where the jaws 24 are close to each other and an opened position where the jaws are away from each other, and a press 26 for producing a sealing pressure between the jaws 24 by pulling the pivotal arms 23 toward each other at the closed position.

Although not shown, the front jaw 24 is provided with a heater for heat sealing, and the rear jaw 24 with a cutter.

When one of the lift frames 22 moves upward, the other lift frame 22 moves down. When the lift frame 22 is in the upper limit position of its up-and-down stroke, the arm opener 25 closes the two pivotal arms 23 to position the jaws 24 close to each other, and the press 26 pulls the arms 23 toward each other to hold the tube T between the jaws 24 and produce a sealing pressure therebetween, whereby the tube T is sealed. The jaws 24 holding the tube T therebetween descend with the lift frame 22, thereby transporting the tube T by a length corresponding to one container. Upon the lift frame 22 reaching the lower limit position of the Stroke, the cutter is actuated to cut the tube T. The press 26 is then brought out of pressing operation, whereupon the arm opener 25 opens the pivotal arms 23 to open the jaws 24 and release the tube T. Thus, the leading end portion of the tube corresponding to one container is separated from the other portion.

The drive mechanism 13 comprises a horizontal drive shaft 31 extending transversely of the apparatus and disposed in the rear of the lower ends of the vertical rods 21 obliquely therebelow, a left jaw unit cam 32 and right jaw unit cam 33 fixed to the drive shaft 31, and an armlike cam follower 34 and similar cam follower 35 extending over the respective cams 32, 33. Although not shown, an arm opening cam is also fixed to the drive shaft 31.

The cam follower 34 for the left jaw unit 11 has a front end connected to the lower end of the vertical rod 21 of the unit 11 by a connecting member 36. The cam follower 35 for the right jaw unit 12 has a front end connected to the lower end of the vertical rod 21 of the unit 12 by a connecting member 37.

At the left side of the right jaw unit cam 33, a main gear 41 is fixedly mounted on the drive shaft 31. Disposed in front of the drive shaft 31 is a horizontal driven shaft 42 extending transversely of the apparatus in parallel to the shaft 31. The driven shaft 42 fixedly carries a driven gear 43 meshing with the main gear 41. The gear ratio of the main gear 41 to the driven gear 43 is 2:1. An arm 44 is secured to the right end of the driven shaft 42 and has an outer end connected to the piston rod 46 of a hydraulic cylinder 45. One end of a pressurized air supply tube 47 is connected to the rod side of the cylinder 45. The other end of the Supply tube 47 is connected to an unillustrated air tank, whereby pressurized air of constant pressure free of pressure variations is supplied to the hydraulic cylinder 45 for urging the piston rod 46 toward a retracted position at all times.

The cams 32 and 33 have the same shape and are each in the form of a plate cam having an outer periphery serving as a cam contour face 51 or 52. The perimeter of the cam contour face 52 subtends 360 degrees and includes a 90-degree portion which is shown as an ascent range U in FIG. 3 and assigned to the ascent stroke of the lift frame 22, the remaining 270-degree portion being shown as a descent range D and assigned to the descent stroke of the lift frame 22. The ascent range U, as well as the descent range D, of the left jaw unit cam 32 is different from the corresponding range of the right jaw unit cam 33 by 180 degrees in phase.

The cam 32 (33) is formed in its right side with an annular recessed portion 53 (54) close to the outer periphery thereof and having an inwardly facing periphery, which provides a guide face 55 (56) extending along the cam contour face 51 (52). The guide face 55 (56) is parallel to the cam contour face 51 (52) where the contour face is in the form of a circular arc but is slightly not parallel to the portion of the contour face 51 (52) which varies in curvature to make the fixed roller 62 and movable roller 67 to be described below identical in Cam lift phase.

Figure 5:
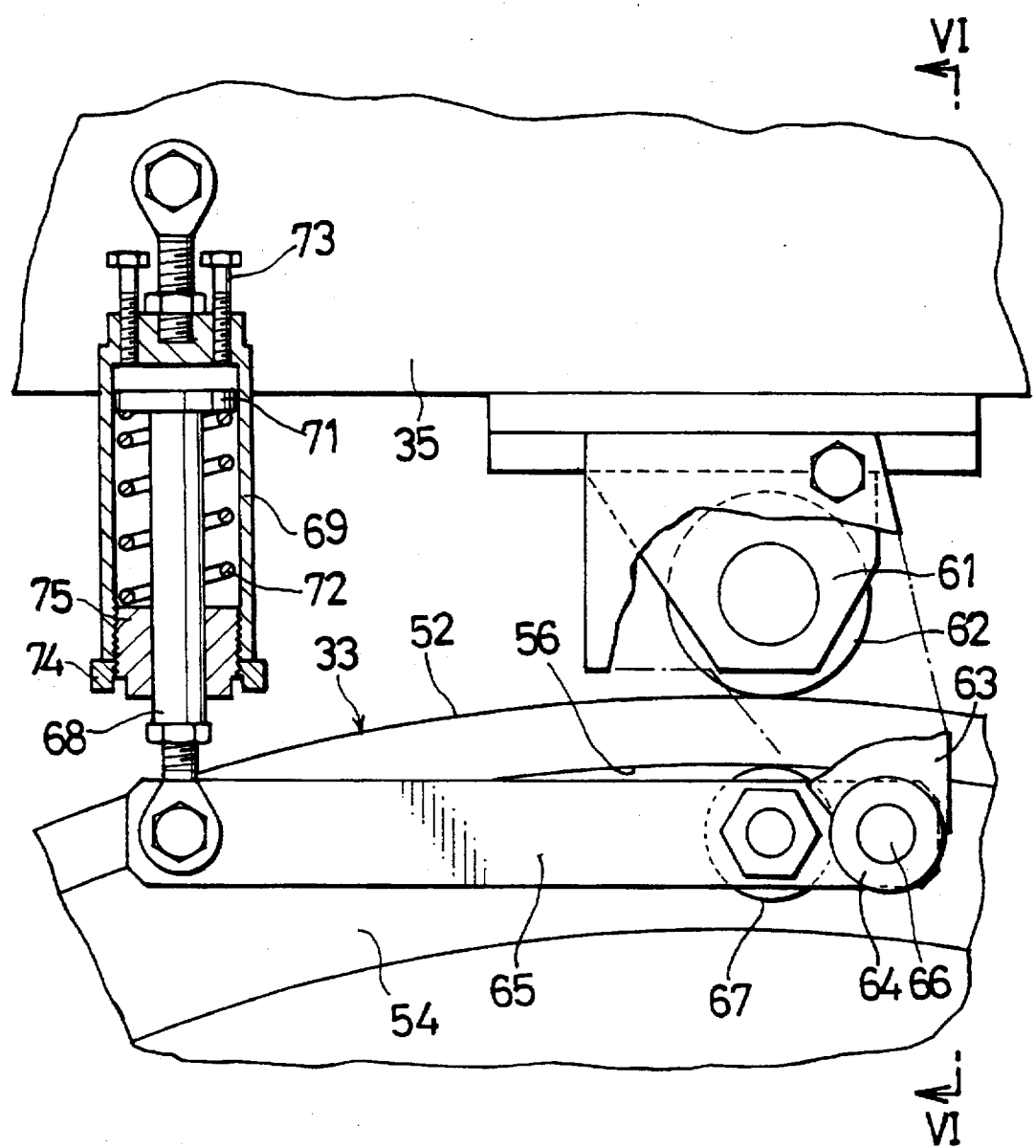
FIG. 5 is an enlarged fragmentary side elevation of the portion shown in FIG. 3.
Figure 6:
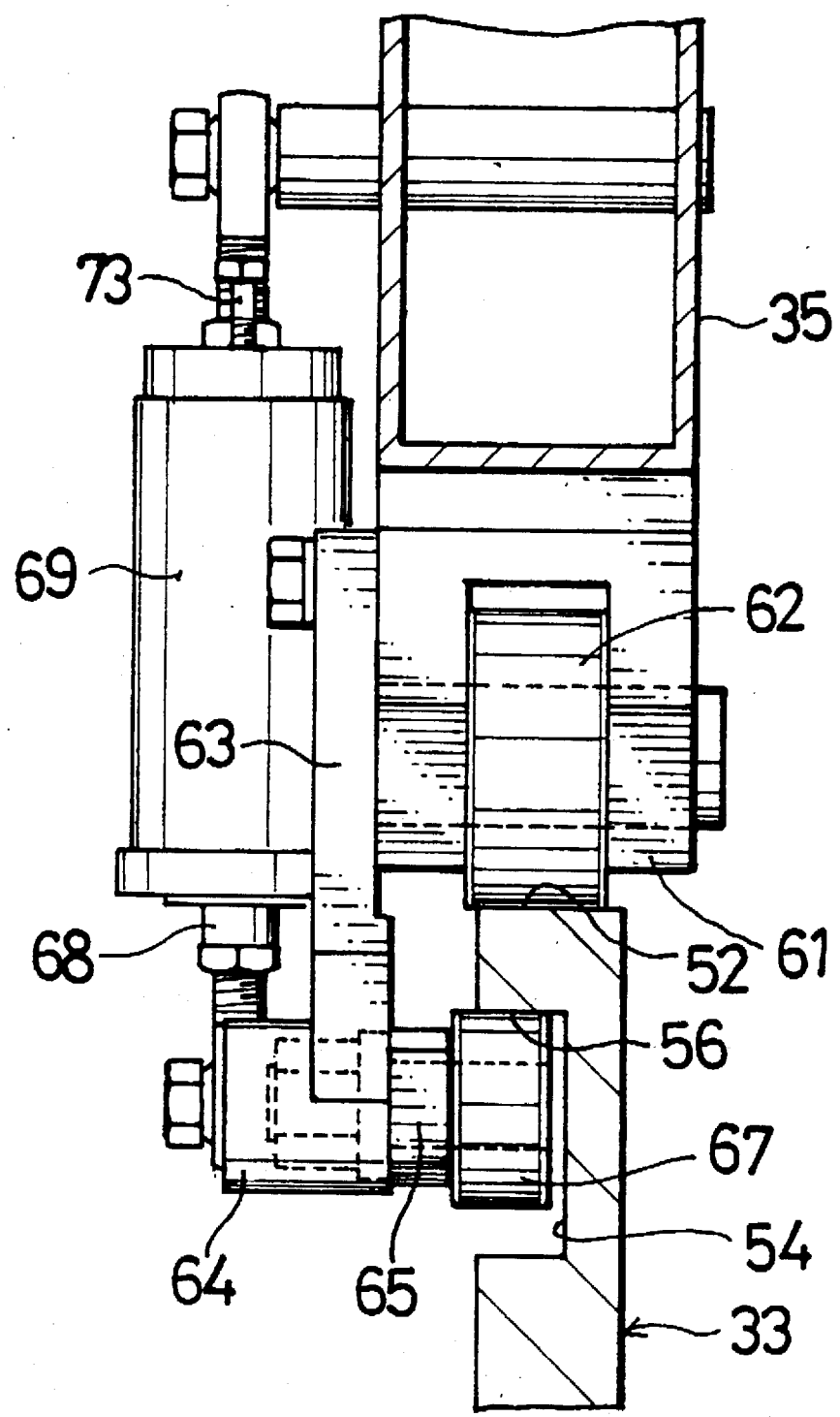
FIG. 6 is a view in section taken along the line VI—VI in FIG. 5.

With reference to FIGS. 5 and 6, the right jaw unit cam follower 35 is provided at a lengthwise intermediate portion thereof with a bifurcated bracket 61 extending downward from the follower. A fixed roller 62 bearing on the cam contour face 52 is mounted on the bracket 61. Fixed to the right side (shown as the left side in FIG. 6) of the bracket 61 is a lever suspending plate 63 extending downward therefrom and having a lower end opposed to the annular recessed portion 54 from the right side thereof. A horizontal guide sleeve 64 is secured to and projects rightward from the lower end of the suspending plate 63. A roller lever 65 extending rearward is disposed at the left end of the guide sleeve 64 and has at its front end a horizontal pivot 65 projecting rightward and rotatably fitted in the guide sleeve 64. In the vicinity of the pivot 66, a movable roller 67 bearing on the guide face 56 is mounted on the roller lever 65 as if projecting leftward therefrom. A vertical pull-up rod 68 has a lower end pivoted to the rear end of the roller lever 65. A vertical tubular spring housing 69 provided with a top wall has an upper end pivoted to the cam follower 35 and an open lower end with a male screw member 75 driven therein. The pull-up rod 68 has an upper portion extending into the spring housing 69 through the screw member 75. A retaining nut 74 is screwed on the screw member 75. The pull-up rod 68 is formed with a flange 71 at its upper end. A roller restraining compression spring 72 is provided between the screw member 75 and the flange 71. Spring holding bolts 73 for releasing the roller 67 extend through the top wall of the spring housing 69 in screw-thread engagement therewith.

The compression spring 72 biases the pull-up rod 61 upward, thereby urging the roller lever 65 to pivotally move upward about the pivot 66. As a result, the fixed roller 62 is pressed against the cam contour face 52 and the movable roller 67 against the guide face 56.

With the movable roller 67 pressed against the guide face 56, a clearance is formed between the pull-up rod 68 and the holding bolts 73. The bolts 73, when forced down in this state, produce a clearance between the movable roller and the guide face 56, thereby releasing the followers 34, 35 from the respective cams 32, 33 and permitting the operator to perform required work such as removal of the followers 34, 35.

Like the right jaw unit cam follower 35, the left jaw unit cam follower 34 is also provided with a fixed roller 62, movable roller 67, etc.

The rotational motion of the drive shaft 31 is converted by the two cams 32, 33 and cam followers 34, 35 into reciprocating motions, which are delivered respectively to the vertical rods 21 of the two jaw units 11, 12. As a result, the jaw unit 11 is lowered with their pivotal arms 23 closed, while the other jaw unit 12 is raised outside the closed pivotal arms 23 of the jaw unit 11, with their pivotal arms 23 opened.

The torque of the drive shaft 31 is great when raising the jaw units 11, 12, and is small when lowering the jaw units 11, 12. While the drive shaft 31 rotates through 360 degrees for one cycle, the drive torque reaches a maximum value and a minimum value each twice. These torque variations are represented by a curve P in FIG. 7.

Figure 3:
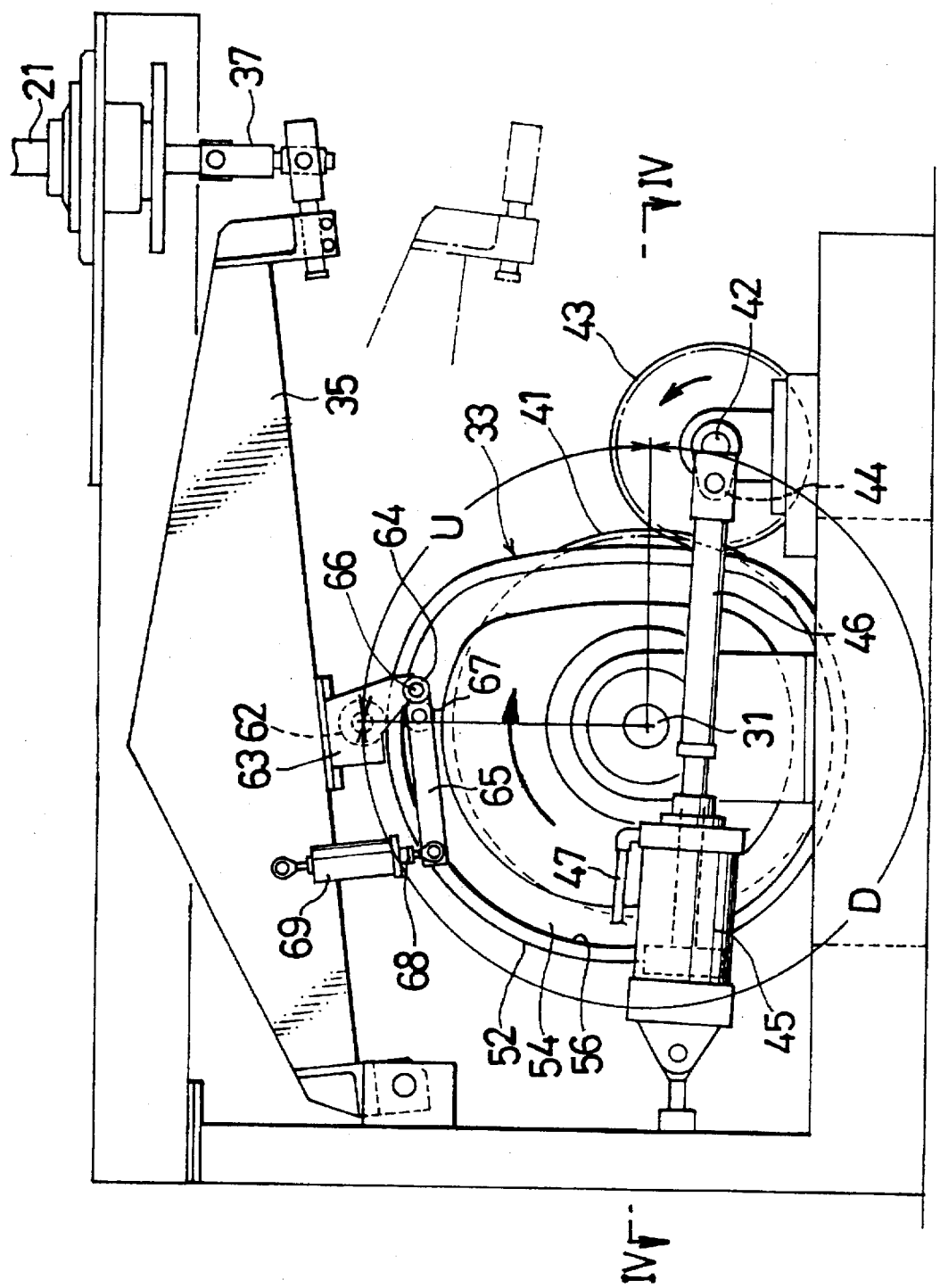
FIG. 3 is a side elevation showing the drive mechanism of the apparatus.
Figure 4:
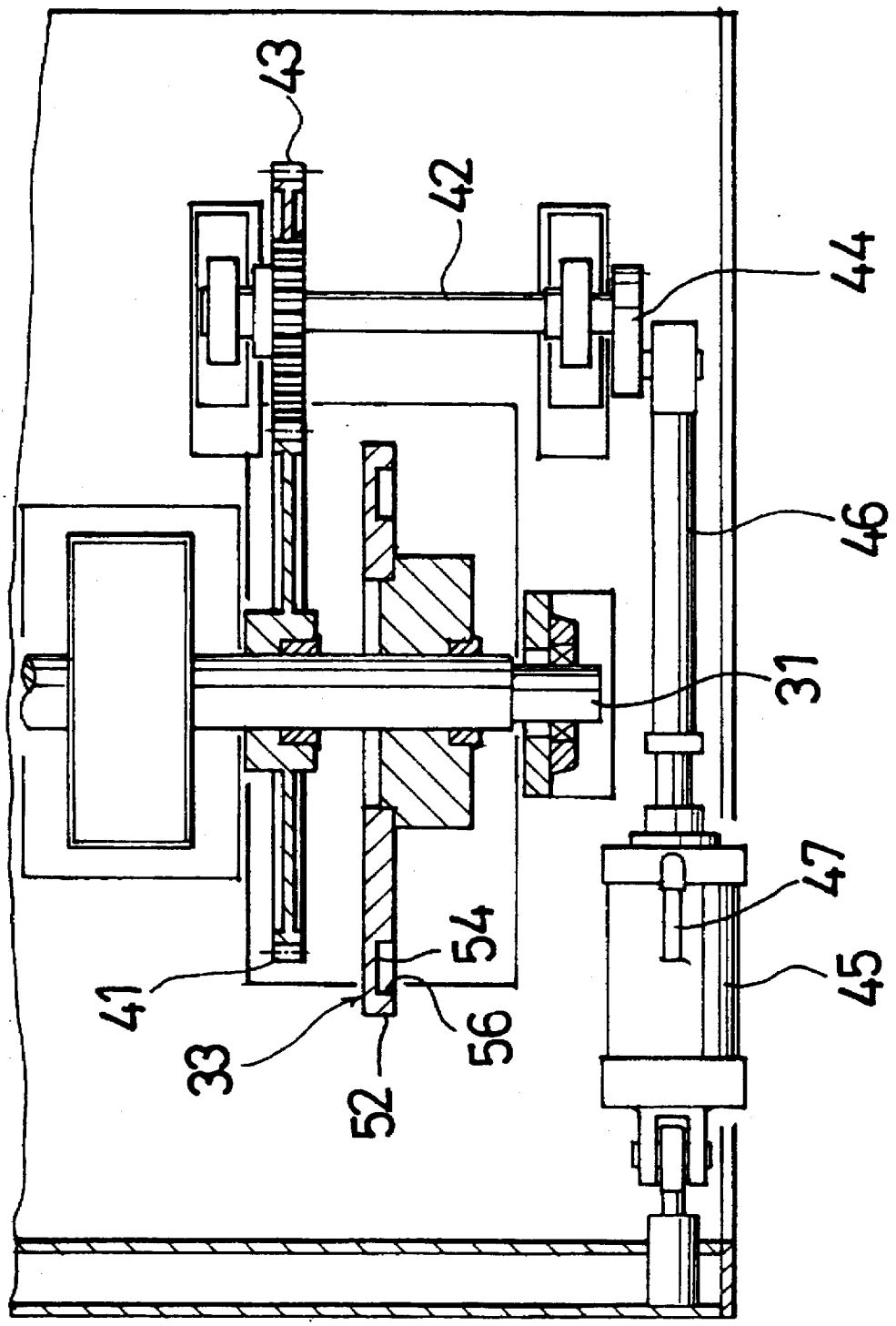
FIG. 4 is a view in section taken along the line IV—IV in FIG. 3.

With reference to FIG. 3, when the drive shaft 31 makes one turn of clockwise rotation, the driven shaft 42 is rotated counterclockwise two turns. One turn of rotation of the driven shaft 42 rotates the arm 44 therewith, causing the piston rod 46 of the hydraulic cylinder 45 to perform a stroke of to-and-fro movement. The advance of the piston rod 46 is effected against the pressure of pressurized air and therefore reduces the torque of the drive shaft 31. Conversely, the retraction of the piston rod 46 takes place in conformity with the air pressure, consequently increasing the torque of the drive shaft 31. Thus, the torque varies as represented by a curve Q (approximate sine curve) in FIG. 7.

FIG. 3 shows the right jaw unit cam 33 as positioned at a border between the ascent range U and the descent range D and the arm 44 as directed rearward, with the piston rod 46 of the hydraulic cylinder 45 in a retracted limit position. At this time, the right jaw unit 12 is in its upper limit position. The right jaw unit cam 33, when rotated through 270 degrees from the position of FIG. 3, moves past the descent range D to reach another border between the descent range D and the ascent range U, bringing the right jaw unit 12 to its lower limit position. In the meantime, the driven shaft 42 is rotated through 540 degrees, i.e., one and a half turns. When the rotation of one and half turns is divided into three half turns, the torque of the drive shaft 31 is successively reduced, increased and reduced every half turn.

The right jaw unit cam 33 is brought to the state of FIG. 3 when rotated through 90 degrees from the border between the descent range D and the ascent range U. More specifically, the cam 33 moves past the ascent range U and the descent range D, raising the right jaw unit 12 to its upper limit position. In the meantime, the drive shaft 42 is rotated through 180 degrees, turning the arm 44 from a forward to a rearward direction to retract the piston rod 46 of the cylinder 45 and consequently increasing the torque of the drive shaft 31.

When raising the right jaw unit 12, the drive torque reaches a maximum value, whereas the increase in the torque of the drive shaft 31 by the hydraulic cylinder 45 diminishes the maximum value.

When the drive shaft 31 is rotated through 180 degrees, the left jaw unit 11 now reaches its upper limit position. In the meantime, the driven shaft 42 is rotated through 360 degrees, i.e., one turn. Accordingly, every time the driven shaft 42 makes a full rotation through 360 degrees, the torque of the drive shaft 31 is increased, whereby the variations in the torque of the shaft 31 are reduced, permitting use of a motor of decreased capacity for driving the drive shaft 31.

Figure 7:
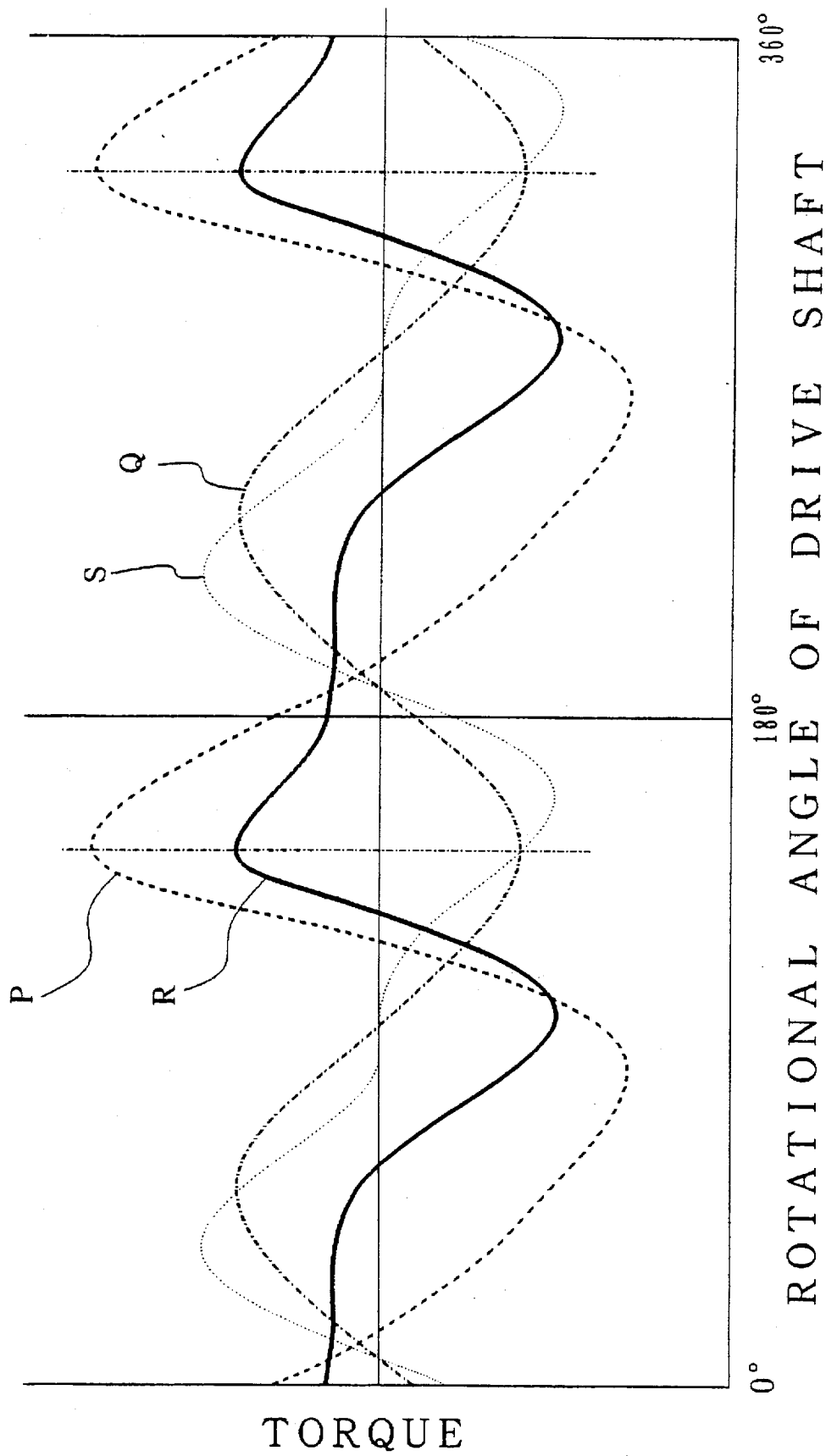
FIG. 7 is a graph showing torque variation curves of a drive shaft.

With reference to FIG. 7, the positive maximum value of the curve P coincides with the negative maximum value of the curve Q (the dot-and-dash line in FIG. 7). The curve P and the curve Q, when combined, make a curve R, and the positive maximum value of the curve R is considerably lower than the positive maximum value of the curve P. This indicates that the torque variations are diminished. An equivalent effect is also available by making the zero point of the curve P coincide with that of the curve Q instead of making the positive maximum value of the curve P coincide with the negative maximum value of the curve Q.

During the ascent or descent of the jaw unit 11, 12, some trouble is likely to occur to overload the units 11, 12 with the tendency for the cam followers 34, 35 to leave the cams 32, 33. In such a case, the roller restraining compression spring 72 is compressed to cause the lever pull-up rod 68 to project from the spring housing 69 and release the fixed rollers 62 from the cam contour faces 51, 52 although the movable rollers 67 remain in contact with the guide faces 55, 56.

Modifications of the drive mechanism 13 will be described next.

Figure 8:
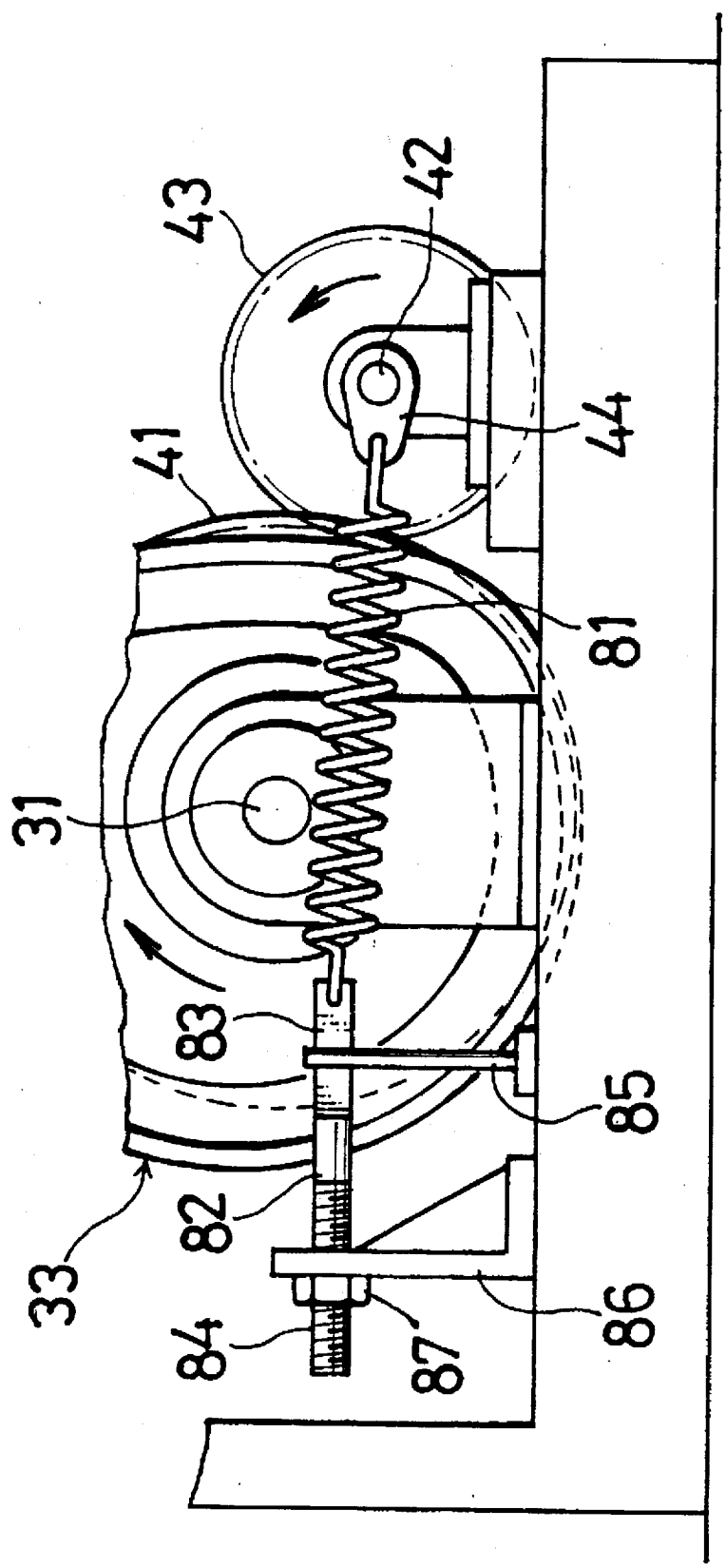
FIG. 8 is a side elevation corresponding to FIG. 3 and showing a modified drive mechanism.

Although the hydraulic cylinder 45 is used as the means for giving a torque to the driven shaft 42 according to the foregoing embodiment, FIG. 8 shows a modification wherein a coiled tension spring 81 is used. The tension spring 81 has a front end attached to the outer end of the arm 44 and a rear end attached to the front end of a spring force adjusting horizontal rod 82 extending longitudinally of the apparatus. The adjusting rod 82 has a cutout 83 in a front portion thereof and is in the form of a male screw 84 in the rear of the cutout. The cutout 83 has a vertical flat-surfaced bottom, against which a vertical retaining rod 85 bears. The male screw 84 has a rear end portion extending through a vertical support bracket 86 to project rearward beyond the bracket. A spring force adjusting nut 87 serving also as a stopper is screwed on the rear projecting portion of the male screw 84.

With the rotation of the arm 44, the spring 81 stretches or contracts, giving a varying spring force. The elastic force to be applied to the outer end of the arm 44 therefore varies. Accordingly, the torque produced in the driven shaft 42 is represented by a curve S in FIG. 7, i.e., a slightly modified sine curve.

Figure 9:
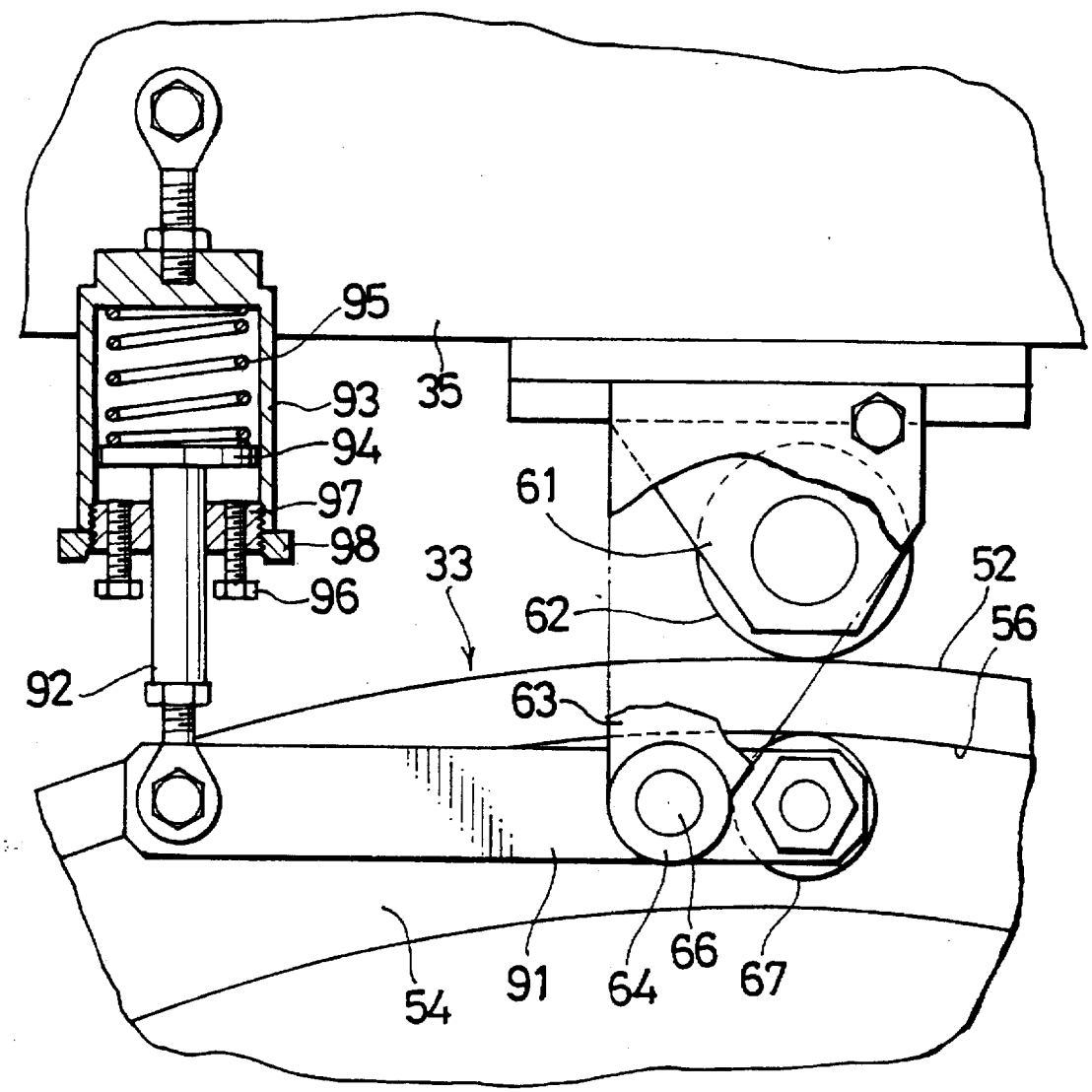
FIG. 9 is a side elevation corresponding to FIG. 5 and showing another modified drive mechanism.

With reference to FIG. 9, a different roller lever 91 is used in place of the roller lever 65 included in the foregoing embodiment. The roller lever 91 has the movable roller 67 mounted on its front end and is supported by the pivot 66 at a portion thereof close to the lever front end. A vertical depressing rod 92 has a lower end pivoted to the rear end of the roller lever 91. As in the foregoing embodiment, a vertical tubular spring housing 93 provided with a top wall has an upper end pivoted to the cam follower 35 and an open lower end with a male screw member 97 driven therein. The depressing rod 92 has an upper portion extending into the spring housing 93 through the screw member 97. A retaining nut 98 is screwed on the screw member 97. The depressing rod 92 is formed with a flange 94 at its upper end. This modification differ from the foregoing embodiment in that a roller restraining compression spring 95 is provided between the top wall of the spring housing 93 and the flange 93, and that spring holding bolts 96 are screwed into the male screw member 97.

Various modifications of the foregoing embodiment will be described below.

Sprockets are usable as the main gear and the driven gear instead of spur gears. A chain or toothed belt is then reeved around the sprockets.

Although the lift frames are two in number and one turn of rotation of the drive shaft involves two cycles of torque variations with the embodiment described, the number of lift frames does not always correspond to the number of torque variation cycles. When the number of lift frames is 2, the number of torque variation cycles can be, for example, 1 or 3.

In the case of one cycle of torque variations, the arm may be secured to the drive shaft, with the driven shaft omitted, or the arm may be secured to the driven shaft provided. The gear ratio of the main gear to the driven gear is then 1:1.

When the driven shaft is provided to which the power of the drive shaft is transmitted by the main gear and the driven gear as in the latter case, the timing of the driven shaft relative to the drive shaft is variable as desired by altering the meshing phase of the two gears so as to achieve the highest effect to reduce the torque variations.

In the case where the number of torque variation cycles is at least 3, the gear ratio of the main gear to the driven gear is n (integer) which is at least 3 and corresponds to the cycle number to 1.

The present invention is applicable, for example, to packaging machines for milk packs of the gabled top type. In this case, the lift frame of the above embodiment is replaced by a lift unit comprising a filling piston of a filling device and a container lift. The interval between the two lift units to be moved up and down is not always 180 degrees but can be, for example, 150 degrees.

Furthermore, the lift units to which the present invention is applicable can be those comprising any mechanical element and having an up-and-down stroke.

What is claimed is:

1. A cam device comprising:

a cam being a plate cam fixed to a horizontal cam shaft and having an outer peripheral surface having a cam contour face facing outwardly, said cam being formed in a side surface thereof with a recessed portion having an inwardly facing periphery, said inwardly facing periphery providing a guide face extending along said cam contour face;

a cam follower having a pivotal center axis in an approximately horizontal direction which extends in parallel with said horizontal cam shaft and being arranged so as to be in bearing contact with said cam contour face;

a roller lever having a pivotal center axis in parallel with said pivotal center axis of said cam follower and being attached to said cam follower;

a roller moving both toward and away from said cam follower, wherein said roller is attached to said roller lever so as to be in bearing contact with said guide face when said roller moves toward said cam follower; and an elastic means for biasing said cam follower and said roller lever so that said roller is pressed outwardly against said guide face and arranged between said cam follower and said roller lever.

2. The cam device as defined in claim 1, wherein said elastic means includes a spring.

3. The cam device as defined in claim 1, wherein said spring is a coiled compression spring which is accommodated in a closed tubular housing having a first end wall at a first end of said housing which opposes a second end wall at a second end of said housing, said housing being pivotally connected at said first end to said cam follower, a rod extending through said second end wall of said second end of said housing, said rod being provided with a flange at a first end of said rod inside of said housing, said spring being held in a compressed state between said flange and said first end wall of said housing, a second end of said rod being pivotally connected to a first end of said lever, a spring holding bolt being screwed into said first end wall of said first end of said housing so as that said first end wall of said housing compresses said spring against said flange.

4. A cam device as defined in claim 1 wherein the elastic means comprises a lever (91) supported at a point between opposite ends thereof by the cam follower (34, 35) so as to be pivotally movable upward and downward and having the movable roller (67) attached thereto at one of the opposite ends, and a spring (95) biasing the lever 91 so as to move the movable roller (67) toward the cam follower (34, 35), the point of support of the lever (91) being at a greater distance from the position where the lever (91) is biased by the spring (95) than from the position where the movable roller (67) is attached to the lever (91).

5. A cam device as defined in claim 4 wherein the spring (95) is a coiled compression spring and accommodated in a tubular housing (93) closed with a wall at each of its opposite ends, the housing (93) being pivoted at one end thereof to the cam follower (34, 35), a rod (92) extending through the wall of the other end of the housing (93), the rod (92) being provided with a flange (94) at one end thereof inside the housing (93), the spring (95) being held in a compressed state between the flange (94) and the wall of said one end of the housing (93), the other end of the rod (92) being pivoted to the other end of the lever (91), a spring holding bolt (96) being screwed into the other end wall of the housing (93) so as to cause its screwed-in end to compress the spring (95) through the flange (94).

* * * * *